United States Patent

Iemura et al.

[15] 3,674,944

[45] July 4, 1972

[54] MAGNETIC TRANSDUCER HEADS

[72] Inventors: Toshio Iemura; Masaru Doi; Yoshiaki Shimizu, all of Moriguchi, Japan

[73] Assignee: Sanyo Electric Co., Ltd.

[22] Filed: June 12, 1970

[21] Appl. No.: 45,670

[30] Foreign Application Priority Data

June 12, 1969 Japan..................................44/46382

[52] U.S. Cl. ........................................179/100.2 C, 29/603

[51] Int. Cl. ..........................................................G11b 5/14

[58] Field of Search .............................179/100.2 C; 29/603; 252/62.51, 62.55-62.58, 62.62

[56] References Cited

UNITED STATES PATENTS

| | | | |
|---|---|---|---|
| 3,145,452 | 8/1964 | Le Craw | 179/100.2 X |
| 3,495,189 | 2/1970 | LeCraw | 252/62.57 X |
| 3,332,796 | 7/1967 | Kooy | 252/62.56 X |
| 3,516,153 | 6/1970 | Schneider | 29/603 |

*Primary Examiner*—Malcolm A. Morrison
*Assistant Examiner*—Jerry Smith
*Attorney*—Irons, Sears, Staas, Halsey and Santorelli

[57] ABSTRACT

A magnetic transducer head comprises a pair of single crystal ferrite core members each having a magnetic path forming surface of a 111 plane, or substantially a 111 plane, such that if inclined thereto no property of a 111 plane is lost. The ferrite block is decreased in thickness by working under a frequency parameter *f* comprising the operating upper limit frequency of the head core, the thickness of the head core affording a $\mu$ conversion point defined by the thickness v. effective permeability characteristic curve of the head core which is not smaller than the width of the track on the record medium engaged by the head.

6 Claims, 11 Drawing Figures

MAGNETIC TRANSDUCER HEADS

BACKGROUND OF THE INVENTION

1. Field of the Invention

This invention relates to a magnetic transducer head formed of single crystal ferrite, and more particularly to a novel magnetic transducer head which has a very narrow track width and affords superior high frequency performance.

2. State of the Prior Art

In U.S. Pat. No. 3,079,470 of M. Camras, there is disclosed a novel magnetic transducer head formed of a pair of single crystal ferrite blocks, and which is characterized by its high resistivity and which affords improved, high frequency performance.

In conventional magnetic heads, the magnetic path forming surface typically is selected to conform to the 110 plane, and, specifically, the 111 plane has been avoided. Selection of the 110 plane is in accordance with certain well-known characteristics of, for example, single crystal ferrite blocks, as disclosed in the Camras patent noted above, which are employed in making the heads.

However, in conventional heads, it has been extremely difficult to produce magnetic heads providing a track width of 120 to 200 microns and an upper limit of the operating frequency of 5 MHz; moreover, it has been practically impossible to produce magnetic heads providing a track width of 80 to 120 microns and an upper limit of the operating frequency of 8 MHz, and, even more so, a track width of 300 to 500 microns and an upper limit of the operating frequency of 2 MHz.

In accordance with the invention, it has been discovered that the 111 plane affords certain unique characteristics providing superior high frequency performance of magnetic transducer heads and permits narrower track widths at the superior high frequency operating regions of the magnetic transducer heads than heretofore attained with the prior art techniques.

SUMMARY OF THE INVENTION

The inventors, after a variety of experimental considerations, discovered that when the thickness of a single crystal ferrite block is decreased gradually under a certain controlled condition with the crystal oriented such that the magnetic path-forming surface of the crystal is in the 111 plane, an effective permeability of each of the crystal planes results wherein the 111 plane is the preferred direction. The preferred direction of the 111 plane is obtained for a region up to a boundary defined by a so-called conversion point, as hereinafter discussed. The controlled condition is that the ferrite block be worked with the upper limit operating frequency applied thereto as a parameter. It was also found that the conversion point has a tendency to shift to the higher side of the parameter frequency $f$ as the thickness of the ferrite block is decreased. That is to say, the magnetic property of the magnetic head increases with the decrease of the thickness of the ferrite block, when the magnetic path-forming surface is formed by the 111 plane rather than formed by the 110 plane or the 100 plane.

Accordingly, an object of the present invention is to provide a magnetic head formed of a single crystal ferrite block and having excellent magnetic properties.

Another object of the invention is to provide a novel magnetic head formed of a single crystal ferrite block affording a superior high frequency operating region.

A further object of the invention is to provide a novel magnetic head formed of a single crystal ferrite block having an extremely narrow track width and affording a superior high frequency operating region.

A still further object of the invention is to provide a magnetic head formed of a single crystal ferrite block and having improved mechanical strength.

According to the present invention, therefore, the magnetic head comprises a pair of single crystal ferrite head core blocks having each a magnetic path-forming surface of a 111 plane, or of substantially a 111 plane, such that if inclined thereto, no property of 111 plane is lost. The magnetic path-forming surface is that adjacent to the planar gap face of the core block, formed of single crystal ferrite, and thus to the tape receiving surface of the head which is in contact with the magnetizable record medium or tape. The thickness of the core block, affording the $\mu$ conversion point, is designed to be not smaller than the width of the track on the record medium which travels continuously across the tape receiving surface of the core block. The $\mu$ conversion point is given by the thickness v. effective permeability characteristic curve of the head when the upper limit of the operating frequency $f$ of the head comprises a parameter of the conditions under which the head is maintained. In accordance with the parameter, and in view of the critical thickness of the core block as formed, the 111 plane provides a higher effective permeability than either of the 110 and 100 planes. The ferrite single crystal block ideally constitutes any of the compositions, manganese-zinc-ferrite, nickel-zinc-ferrite, garnet, manganese-ferrite or nickel-ferrite.

A head core structured in accordance with the invention at a working frequency of 1 MHz or below and having a track width of 500 microns affords excellent magnetic characteristics when the magnetic path-forming surfaces conform to the 111 plane. Although these conditions do not suffice for making a magnetic head having an operating upper limit frequency of 2 MHz, by adjusting the conditions in accordance with the invention, a magnetic head having such characteristics may also be realized. Accordingly, a head core having a track width of 300 microns may be made by increasing the working upper limit frequency up to 2 MHz. Furthermore, a head core having a track width of 200 microns and retaining the desired superior operating characteristics may be made by increasing the upper limit working frequency to 5 MHz; in addition, a head core having a track width of 120 microns may be made by increasing the working upper limit frequency to 15 MHz. In each such case, the superior operating characteristics of the head core have been obtained. As a further example, a head core having a track width of 80 microns and fabricated in accordance with the invention has demonstrated an operating upper limit frequency of more than 8 MHz, as expected.

Consequently, a magnetic core may be made in accordance with the invention which is ideally suited for use as a magnetic head of video tape recorder recording and reproducing color television signals.

These and other objects of the invention will become more clearly apparent after a study of the following specification when read in connection with the accompanying drawings, in which:

DETAILED DESCRIPTION OF THE INVENTION

Figure 1:
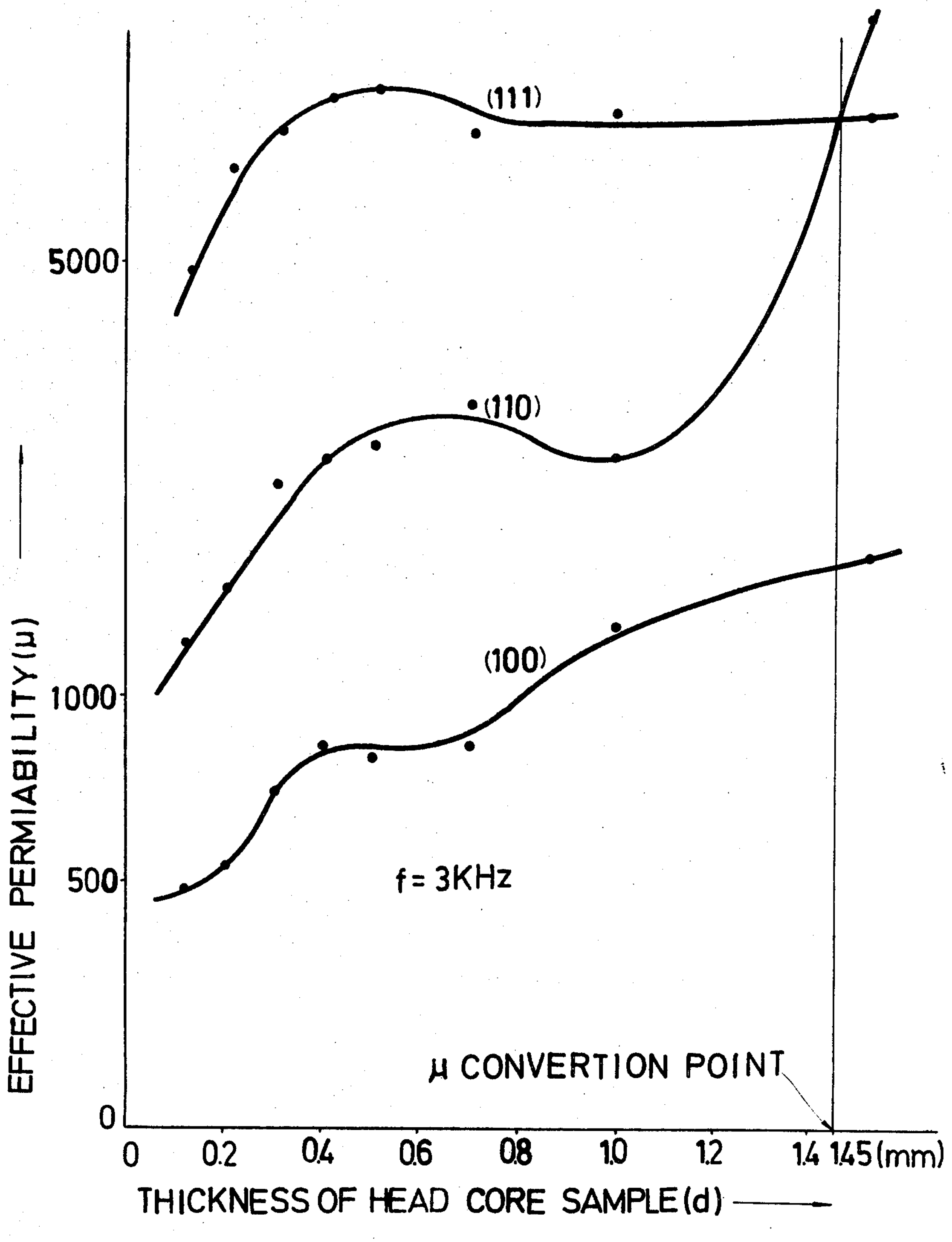
FIGS. 1, 2, and 3 comprise graphs of the thickness-effective permeability characteristic curves of single crystal ferrite blocks at each of the specified crystal planes wherein the working, or upper limit operating frequency is taken as the parameter.

In general, single crystal ferrite material has an extremely large crystal magnetic anisotropy, and when a magnetostatic field is applied in a certain direction, the crystal magnetic anisotropy energy $E_u$ per unit volume is given by the following approximate formula:

$$E_a = K_1 (\alpha_1^2\alpha_2^2 + \alpha_2^2\alpha_3^2 + \alpha_3^2\alpha_1^2) \ldots$$

where $K_1$ is an anisotropy constant, and $\alpha_1$, $\alpha_2$, and $\alpha_3$ are respectively cosines of angles between the magnetic vector and the crystal axis.

From the formula (1), in a ferrite having $K_1>0$, the related order of each of the crystal axes for the directions of easy magnetization or preferred (i.e., easily magnetizable) directions is given as follows:

$$[100]>[110]>[111] \ldots \quad (2)$$

Correspondingly, with regard to the magnetic path-forming surface, the related order of the easily magnetizable planes is given as follows:

$$(100)>(110)>(111) \ldots \quad (3)$$

By contrast, in a ferrite having $K_1<0$, the related order of each of the crystal axes for the preferred directions is given as follows:

$$[111]>[110]>[100] \ldots \quad (4)$$

Correspondingly, with regard to the magnetic path-forming surface, the related order of the easily magnetizable planes is:

$$(110)>(111)>(100) \ldots \quad (5)$$

To summarize, in a single crystal ferrite material having $K_1>0$, the 100 axis (100 axis is a general term given to 100, 010, 001, $\bar{1}00$, $0\bar{1}0$, $00\bar{1}$ axes) is the preferred, or easy, direction of magnetization, whereas the 111 axis (111 axis is a general term given to eight axes such as 111, $\bar{1}11$, $1\bar{1}1$, $11\bar{1}$, . . . ) is the hard direction of magnetization. However, in a single crystal ferrite having $K_1<0$, the 111 axis is the preferred or easy direction, and the 100 axis is the hard direction of magnetization. Most compositions of manganese ferrite and nickel ferrite have $K_1<0$, whereas those of cobalt ferrite and manganese ferrite including a small quantity of manganese have $K_1>0$.

Accordingly, in cases where the magnetic property is considered to be more important than the mechanical strength, and for a ferrite having $K_1>0$, the magnetic path-forming surface should be selected to have the 100 plane and thus the preferred direction of the 100 axis, whereas for a ferrite having $K_1<0$, the magnetic path-forming surface should be selected to have the110 plane, and thus the preferred direction of the 111 axis. Heretofore, the typical approach has been to avoid selecting the 111 plane, in defining the magnetic path-forming surface, such that neither the 100 axis direction nor the 111 axis direction is utilized for the magnetic path-forming surface.

Figure 2:
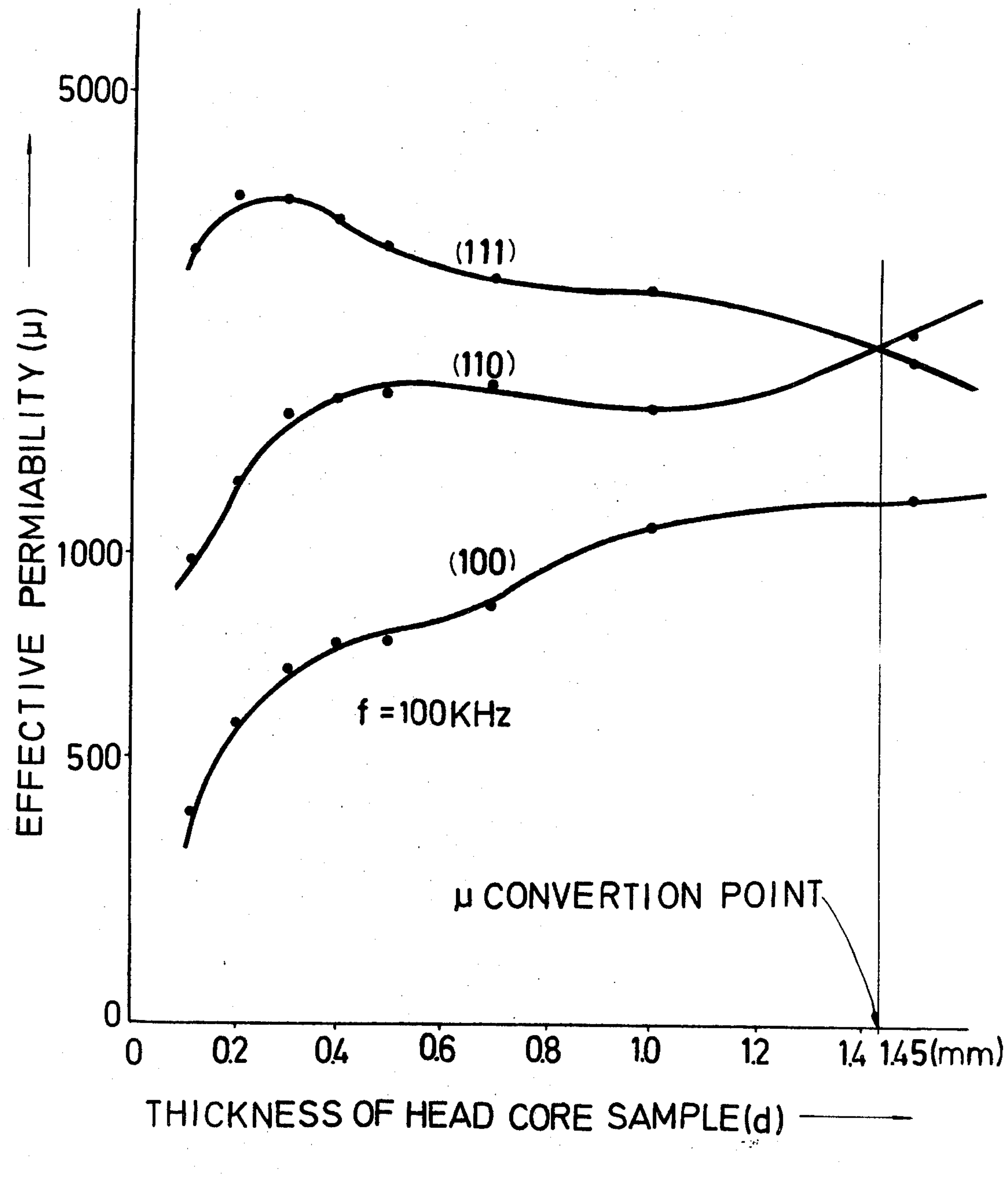
Figure 3:
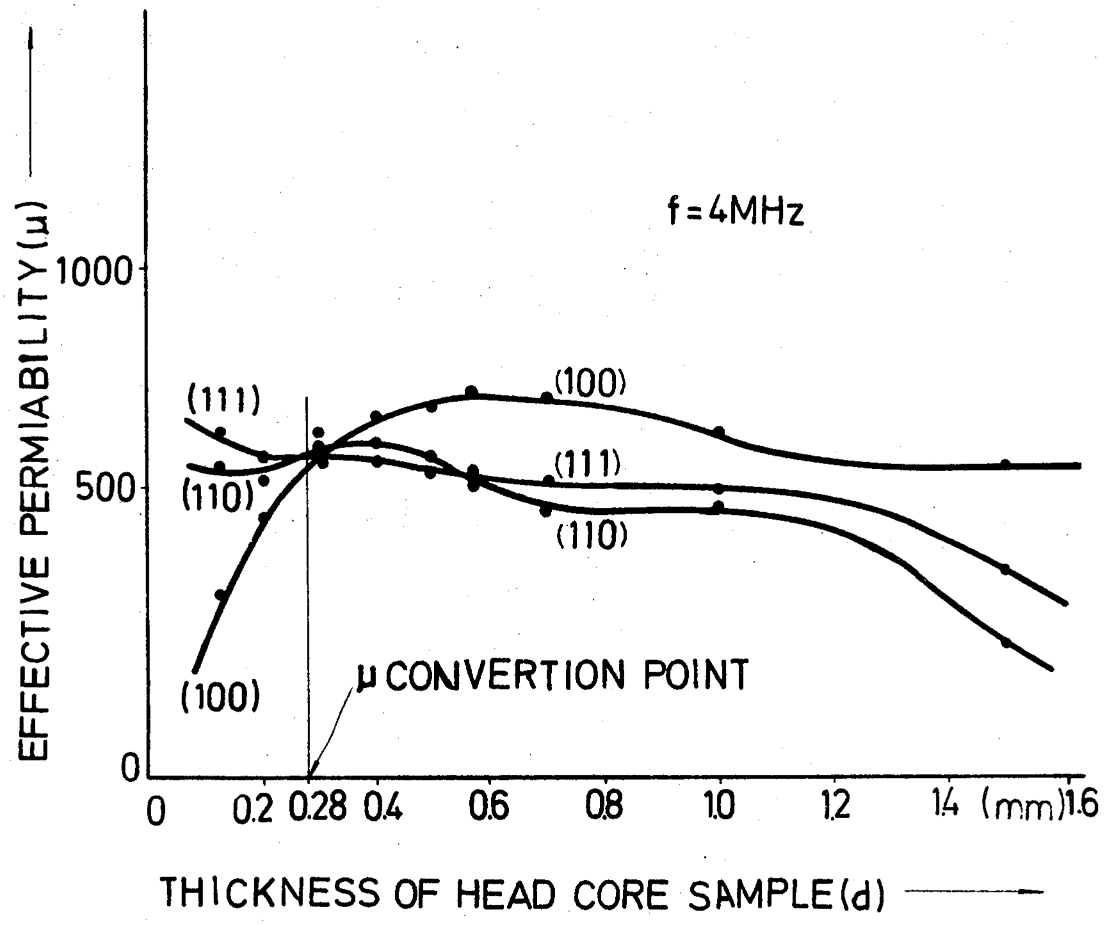

In the graphs of FIGS. 1, 2, and 3, the thickness of head core block and the effective permeability are graduated on abscissa and ordinate, respectively. The single crystal ferrite blocks which were measured to provide the values for these graphs comprised ring samples made of manganese-zinc-ferrite having an outside diameter of 4 mm, an inside diameter of 1.5 mm, the magnetic path-forming surfaces being selected as the measuring surface. Here, the composition of the manganese zinc ferrite includes 25 mol percent of MnO, 25 mol percent of Zn and 50 mol percent of $Fe_2O_3$.

FIG. 1 comprises a graph of the thickness v. effective permeability characteristic curves of the sample, as specified at a frequency $f$ = 3 KHz, for the specified planes. With a sample having a thickness of about 1.45 mm or more, the most preferred direction is that of the 110 plane. However, as the thickness of the sample is decreased, the preferred direction reverses markedly, although not as a linear function, to the 111 plane. In accordance with this characteristic, and for a thickness less than a certain value, the 111 plane affords a consistently higher effective permeability than either of the other planes, i.e., the 110 and 111 planes. This critical thickness id defined herein as "a conversion point of $\mu$ characteristic", or, more simply, a "$\mu$ conversion point", as identified in FIG. 1.

The source, or explanation, of this phenomenon is not clear as yet, even theoretically. However, it has been observed that the conversion point of $\mu$ characteristic shifts, as the frequency $f$, the above-noted operating parameter, is increased, to smaller thicknesses of the core sample, in a generally consistent manner over a region.

FIG. 2 shows a result of experiments for $f$= 100 KHz. FIG. 3 shows an experimental result for $f$=4 MHz, and as is clear from the graph of FIG. .3, the preferred directions for each of the crystal planes change four times in an intertwined fashion with respect to each other according to the thickness of the sample. Thus, by relating these measured characteristics and ordering them with respect to the thickness of the samples, the following conclusions or results may be derived:

| For thickness of sample: | Order of preferred planes |
|---|---|
| d ≧ 0.56 | (100)>(111) ≧(110) |
| 0.56>d ≧ 0.31 | (100) ≧ (110)>(111) |
| 0.31>d ≧ 0.30 | (110)>(100) ≧(111) |
| 0.30>d ≧ 0.28 | (110)>(111)>(100) |
| 0.28 ≧ d | (111)>(110)>(100) |

Here, $d$ = 0.28 mm is the "conversion point of $\mu$ characteristic". When a sample having a thickness ≦ 0.28 is used, the preferred direction becomes (111)>(110)>(100); moreover, as the thickness of the sample is decreased, this characteristic becomes more pronounced.

Figure 10:
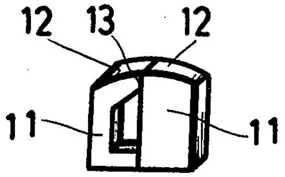

Accordingly, and with reference to FIG. 10, to be described in detail hereafter, by forming the magnetic path-forming surfaces 11 adjacent to tape receiving surfaces 12 and thus the planar gap faces of the video head in the 111 plane, and by providing a track width of 120 microns, a magnetic characteristic is obtained which is far superior to that of a conventional magnetic head. As previously discussed, in a conventional magnetic head, the magnetic path-forming surface is constituted by 110 plane, a selection conforming to the heretofore expected, conventional determination of the preferred direction. In order to confirm these evaluations and conclusions, and to facilitate the design of head cores wherein the working frequency and the track width are specified, the characteristic curves of frequency v. effective permeability for various thicknesses of samples, i.e., wherein the different thicknesses were taken as the distinguishing parameter, were plotted. Accordingly, FIGS. 4 through 7 are graphs of frequency-permeability characteristics for different cases in accordance with the thickness parameter, and specifically for sample thicknesses of $d$ = 0.12 ± 0.005 mm, $d$ = 0.20 ± 0.005 mm, $d$ = 0.30 ± 0.005 mm, respectively.

Figure 4:
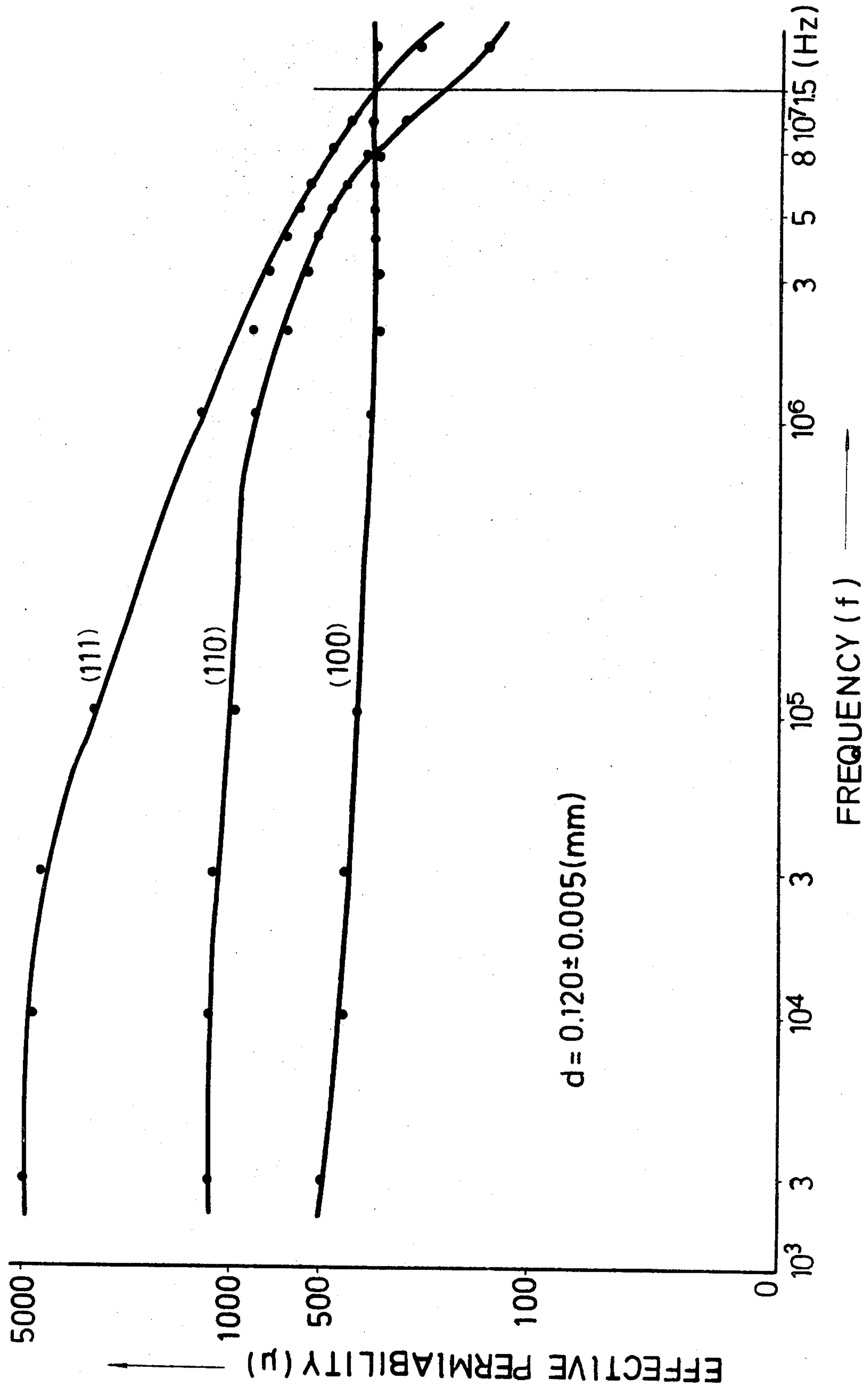
FIGS. 4, 5, 6, and 7 comprise graphs illustrating frequency-characteristic curves for each of the specified crystal planes with thickness of the ferrite single crystal block taken as the parameter.
Figure 5:
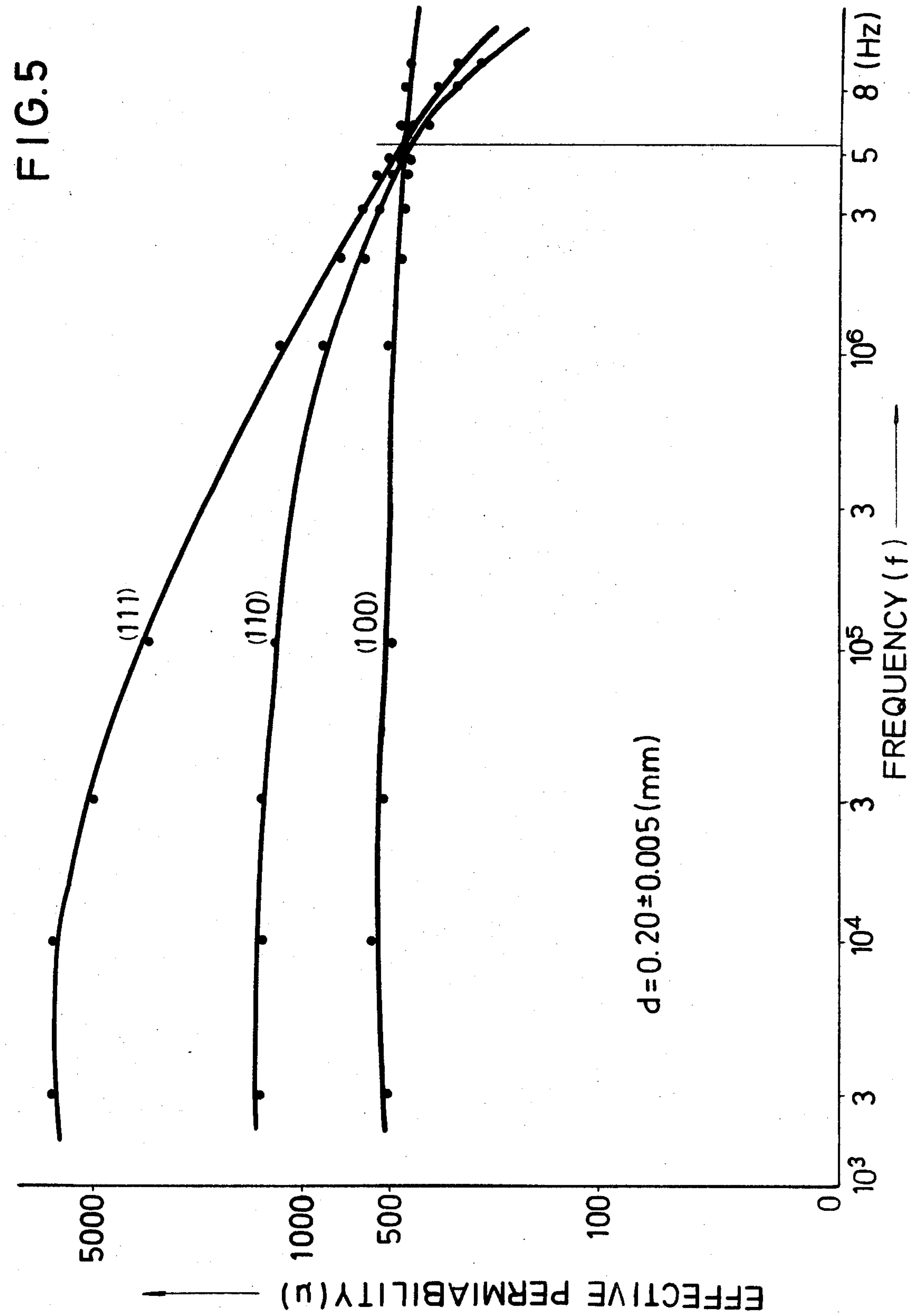
Figure 6:
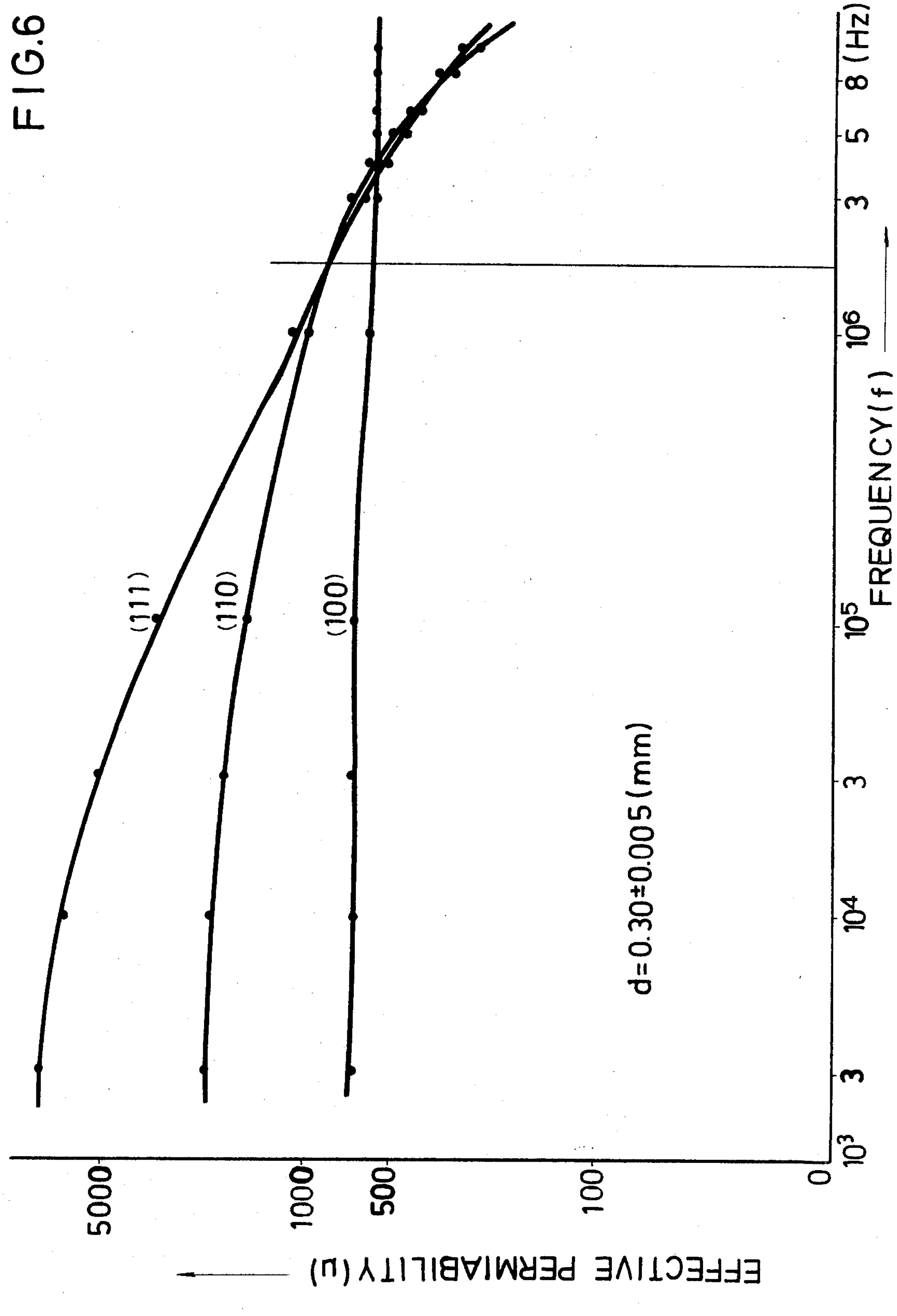
Figure 7:
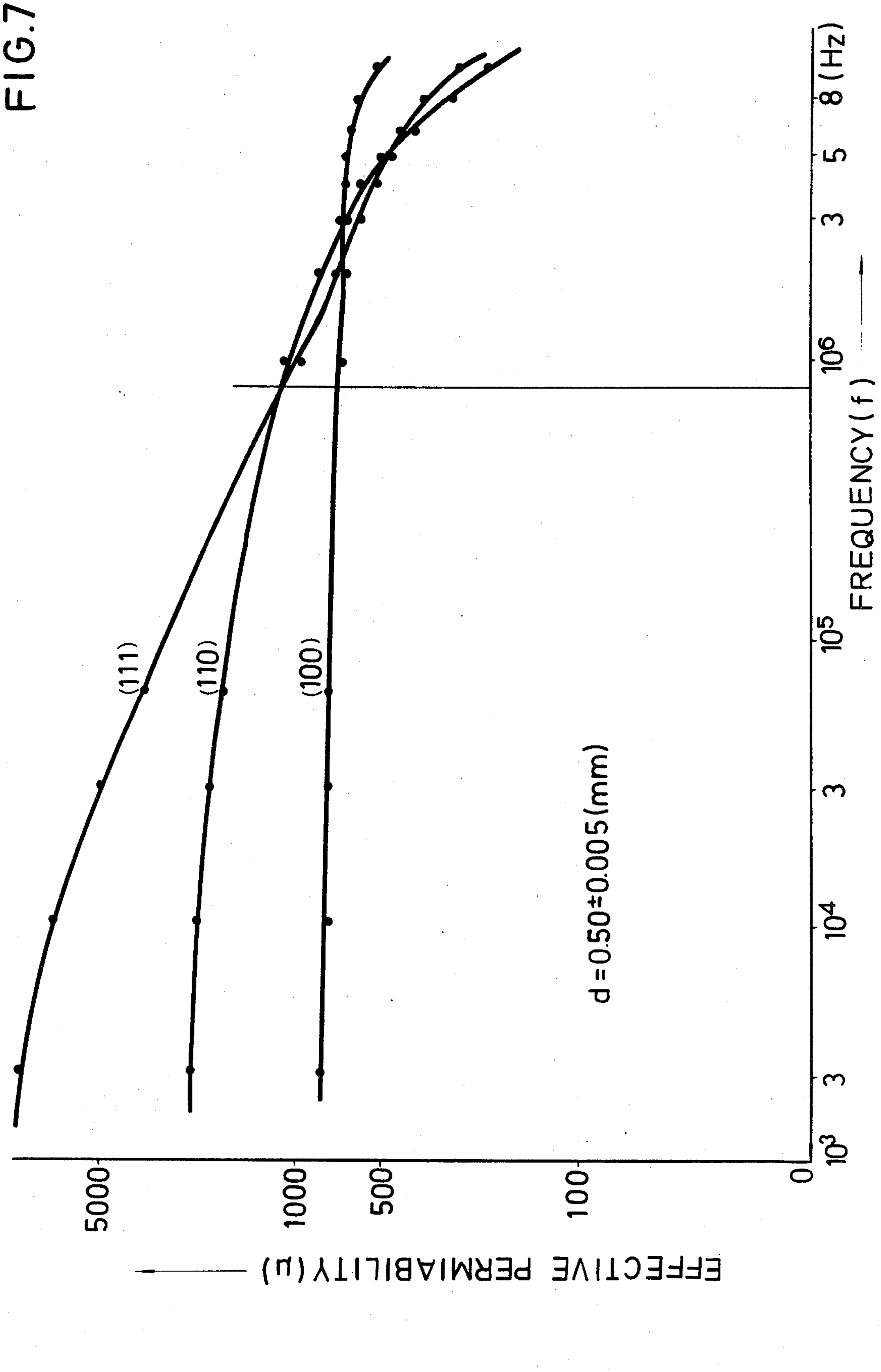

Referring to the graph of FIG. 4 as an example, there is shown the graph of a magnetic recording head of a type employed as a so-called rotary video tape recorder head. The head has a track width of 0.12 ± 0.005 mm, the magnetic path-forming surface of which, i.e., the surface adjacent to both the above-mentioned tape receiving surfaces and the planar gap faces, being defined by the 111 plane in accordance with the invention. As shown by the graph, throughout an operating region up to an upper limit frequency of about 15 MHz the magnetic characteristics of the head are far superior to those afforded by conventional heads which, as heretofore described, have the magnetic path-forming surfaces defined by either the 110 or the 100 planes.

A method of making a single crystal ferrite head according to the present invention is now described with reference to FIGS. 8 through 11, these figures illustrating successive stages of construction of a single crystal ferrite head formed in accordance with the present invention.

Figure 8:
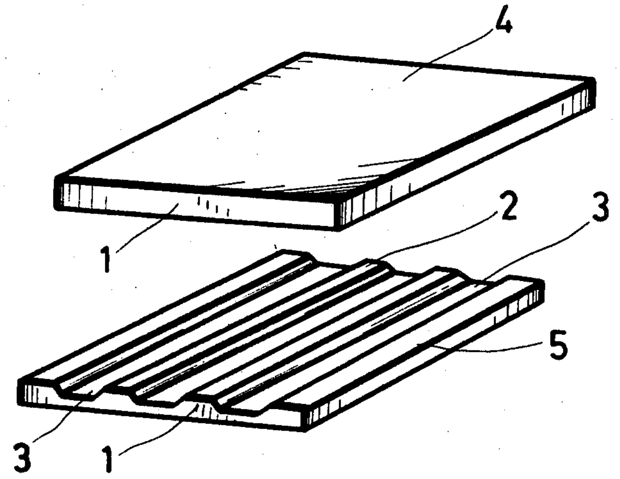
FIGS. 8, 9, 10, and 11 illustrate the construction of the magnetic recording head of the invention at successive steps in the manufacturing process.

A single crystal ferrite bar as shown in FIG. 8 is mounted on a gonimeter, and its orientation determined by means of Laue X-ray photograph. The bar then is cut by a diamond cutter or a cutting machine in such a manner that a narrow-width plane, i.e., the end surface 1, is defined by the 111 plane. As illustrated, both an upper bar 4 and a lower bar 5 are thus prepared. The bars thus cut are mirror-polished, on a wide planar surface of each, such as the confronting, parallel planar surfaces of the bars 4 and 5. Winding slots 3 are provided such as by supersonic machining of one of the bars, such as the bar 5, through the polished surface. The machined surface thus includes the polished portions 2 and the machined slots 3. The members 4 and 5 then are bonded together at the mirrored, or polished, surfaces with enamel, glass, etc., as the adhesive.

Figure 9:
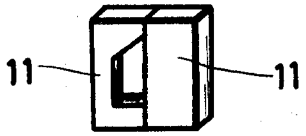

The bonded members are then cut and separated longitudinally on both sides of the winding slots, i.e., longitudinally along the surfaces 2, and each longitudinal portion thus cut is further severed into head core blocks of appropriate thickness, as illustrated in FIG. 9. The head core block thus formed in FIG. 9 is further machined in accordance with the invention to define a tape receiving surface 12. In each of FIGS. 9 and 10, the surfaces 11 conform to the 111 plane as heretofore described. Further, in the machining of the head core block as heretofore detailed, the head core is subjected to the upper limit operating frequency $f$. The thickness of the head core blocks is selected in accordance with the required structural strength, and a considerable thickness may be provided to assure adequate strength.

Figure 11:
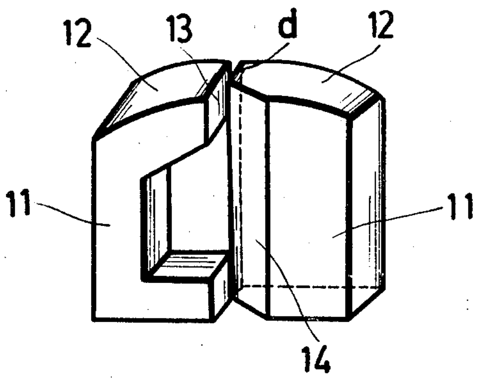

The required track width of the head is then obtained by angularly cutting the block from the surface 11 inwardly of the gap face 13, thereby cutting the tape receiving surface 12 and the planar gap face 13 to the required track width; the cutting as thus described is illustrated at 14 in FIG. 11.

In the perspective view of FIG. 11 as well as in the views of FIGS. 9 and 10, it is to be understood that suitable spacing of the two sections of the head afforded such as by the above-mentioned insulating material applied to the opposing faces of the blocks 4 and 5 in securing the heads together. In working of the head core blocks to the required thicknesses, it is noted that the thickness selected in accordance with the desired conversion point is that defined by the dimension d and not the thickness of the head core block in total, since the critical thickness defining the conversion point is that corresponding to the width of the recorded track on the recorded medium which is received over and travels continuously over the tape receiving surfaces 12 of the core members.

Since the surfaces 11 are formed of the 111 plane, the magnetic characteristics of the magnetic head formed in accordance with the invention are excellent, affording superior operating characteristics to those obtained heretofore in the prior art.

It will be apparent that many modifications and variations may be effected without departing from the scope of the novel concepts of the present invention.

What is claimed is:

1. A magnetic transducer head comprising a pair of single crystal ferrite core members each having a magnetic path-forming surface of substantially a (111) plane, said magnetic path-forming surface of each member comprising the surface adjacent to the planar gap face thereof and to the tape receiving surface thereof, and the thickness of each of said core members affording a $\mu$ conversion point not smaller than the width of the track on a record medium received on said tape receiving surface thereof, said $\mu$ conversion point being given by the thickness-effective permeability characteristic curve of the core member when the upper limit frequency $f$ is taken as the parameter.

2. A magnetic transducer head as recited in claim 1 wherein said single crystal ferrite core member material is one selected from the group consisting of manganese-zinc-ferrite, nickel-zinc-ferrite, garnet, manganese-ferrite and nickel-ferrite.

3. A magnetic transducer head as recited in claim 1 wherein said track width is from 80 to 500 microns.

4. A magnetic transducer head as recited in claim 1 wherein each of said core members in the portions thereof remote from said gap face is of a thickness exceeding said width of the track of the recording medium received on said tap receiving surface thereof.

5. A magnetic transducer head as claimed in claim 1, wherein each of said core members is formed with a cut-out portion for accommodating therethrough a winding, said planar gap face formed between said two core members in such a way that a pair of end surface of one of said core members is confronted with a pair of corresponding surfaces of the other core member, both of said end surfaces being polished to optical flat.

6. A magnetic transducer head comprising a pair of single crystal ferrite core members, at least one of said core members being formed with a cut-out portion for accommodating therethrough a winding, a planar gap face formed between said two core members in such a way that a pair of end surfaces of said first mentioned core member is faced toward one lateral surface of the other core member, said end surfaces and said lateral surface being polished to optical flat, a magnetic path forming surface formed by a pair of broad surfaces of said two core members lying at right angles to the planar gap face, said magnetic path forming surface being confronted with the (111) plane of said single crystal, and a tape receiving surface formed by a pair of surfaces of said core members narrow with respect to said broad surfaces and lying, at a position adjacent to a magnetic gap which is an open end of said planar gap face, at right angles to said planar gap face and also to said magnetic path forming surface, said tape receiving surface being adapted to receive a magnetic recording tape over said surface, the thickness of said tape receiving surface adjacent to said magnetic gap being smaller than the $\mu$ conversion point which is given by the thickness-effective permeability characteristic curve of the core member when the upper limit frequency $f$ is taken as the parameter.

* * * * *